United States Patent [19]

Severinsson

[11] Patent Number: 5,025,900

[45] Date of Patent: Jun. 25, 1991

[54] SEALING ARRANGEMENT, PARTICULARLY FOR A RAIL VEHICLE SLACK ADJUSTER

[75] Inventor: Lars M. Severinsson, Hishult, Sweden

[73] Assignee: SAB Nife AB, Landskrona, Sweden

[21] Appl. No.: 371,279

[22] Filed: Jun. 26, 1989

[30] Foreign Application Priority Data

Jun. 30, 1988 [SE] Sweden ............................ 8802463

[51] Int. Cl.⁵ ...................... B61H 15/00; F16D 65/38
[52] U.S. Cl. ................................ 188/322.12; 188/198; 277/237 A
[58] Field of Search .................. 188/197, 198, 322.12, 188/322.19, 271, 322.17; 277/237 A

[56] References Cited

U.S. PATENT DOCUMENTS

| | | | |
|---|---|---|---|
| 2,092,259 | 9/1937 | Padgett | 188/322.12 |
| 2,369,007 | 2/1945 | Beecher | 188/271 |
| 2,928,507 | 3/1960 | Thompson | 188/271 |
| 3,132,532 | 5/1964 | Polanin | 188/197 |
| 3,874,484 | 4/1975 | Nadas et al. | 188/197 |
| 3,889,994 | 6/1975 | Edwards | 188/271 |
| 4,529,213 | 7/1985 | Goodman | 188/322.12 X |
| 4,676,518 | 6/1987 | Kartchner et al. | 277/237 A |

FOREIGN PATENT DOCUMENTS 1902019 8/1970 Fed. Rep. of Germany ...................... 188/322.12

Primary Examiner—Matthew C. Graham
Attorney, Agent, or Firm—Laurence R. Brown

[57] ABSTRACT

A sealing arrangement, particularly for a rail vehicle slack adjuster, between a generally tubular housing (7) and a rod (1), which is axially and rotatably movable relative thereto, has a cup (10) engaging the rod with a sealing ring (11) so as to be movable with the rod. This cup extends along the rod over the free end of the housing so as to form a type of labyrinth sealing. The cup is preferably provided with a protective and guiding internal ring (12) cooperating with the housing.

2 Claims, 1 Drawing Sheet

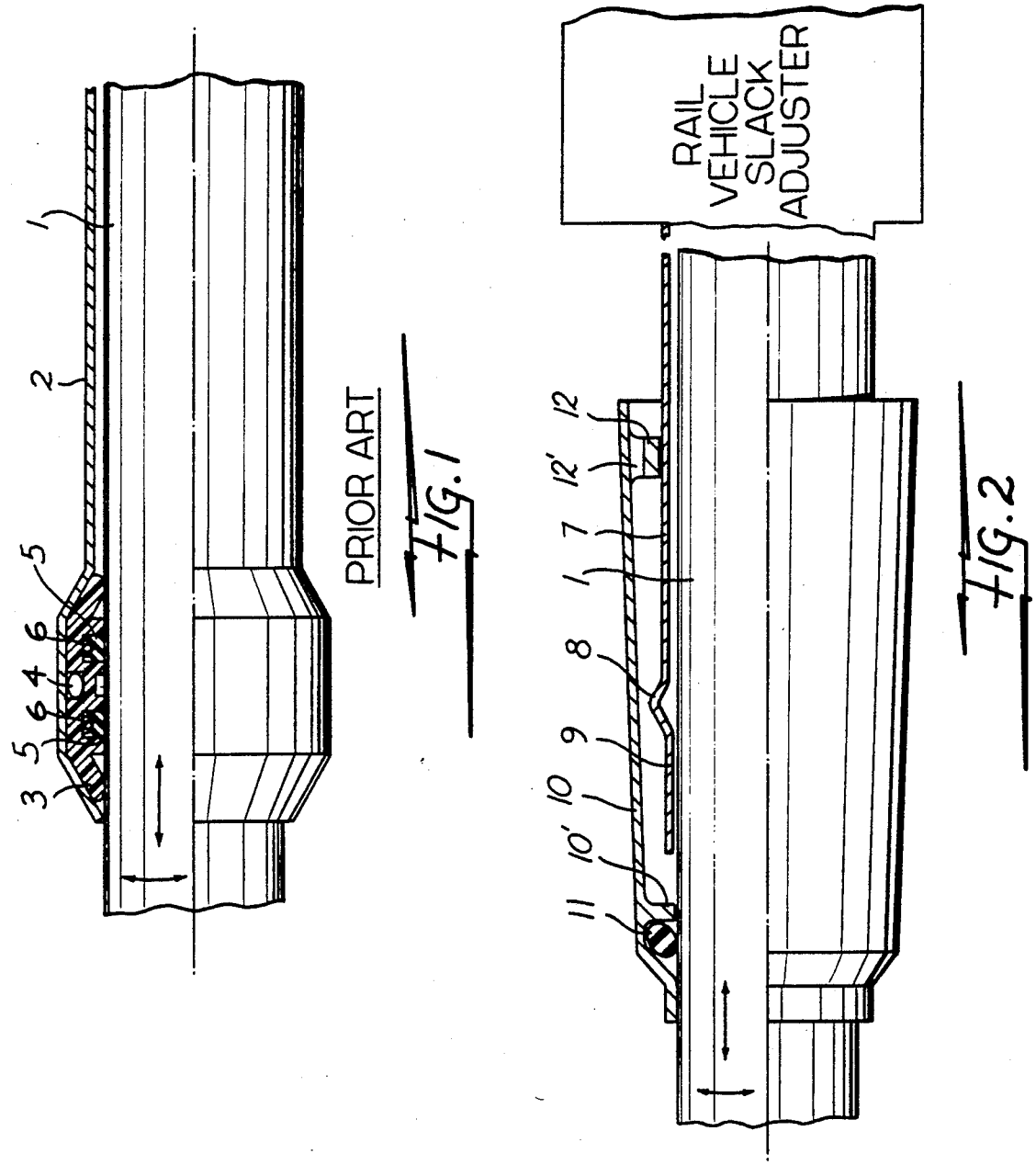

5,025,900

SEALING ARRANGEMENT, PARTICULARLY FOR A RAIL VEHICLE SLACK ADJUSTER

TECHNICAL FIELD

This invention relates to a sealing arrangement, particular for a rail vehicle slack adjuster, between a generally tubular housing and a rod, which is axially and rotatably movable relative thereto.

BACKGROUND OF THE INVENTION

As is well known to any person skilled in the art, there are both axial and rotational relative movements between the rod or spindle and housing or barrel of a conventional rail vehicle slack adjuster of the axial type at each and every brake operation. This means that the required sealing between the rod and the housing is exposed to great wear, not the least in view of the extremely harsh environment underneath a rail vehicle, where the slack adjuster is mounted.

A typical prior art sealing in the housing may consist of one or more internal sealing rings engaging the rod. These sealing rings may be made of a plastic material in order to withstand the wear better than rubber rings. The result is, however, not statisfactory in some instances when the sealing after a certain period of operation is not tight any more and allows water and contaminants to enter the interior of the slack adjuster resulting in rust problems and eventually function disturbances.

THE INVENTION

Then main problem with prior art sealings, namely the wear resulting from the continual relative movements between the rod and the housing, can according to the invention be obviated by a sealing arrangement characterized in that a cup, engaging the rod with a sealing ring so as to be movable with the rod and having an internal diameter greater than the diameter of the rod, extends along the rod over the free end of the housing.

By the fact that this protective cup—extending over the housing end—moves together with the rod in all rotational movements and in axial movements not exceeding a certain length (cf below), there will be very little wear of the sealing ring, which accordingly will have an extremely long useful life.

In order to improve the protection against the intrusion of foreign matters into the housing via the cup end remote from the sealing, the cup is here provided with an internal ring with an inner diameter slightly larger than the outer diameter of the housing. This ring is not only protective but also serves as a guiding for the cup on the housing.

In spite of the protection moisture and even water can enter the cup. In order to allow condensate and water to leave the cup easily, the cup wall is inclined outwards; differently stated: the cup has a larger diameter towards its free end than at its end engaging the rod. Further, the internal ring in the cup is provided with a number of through holes flush with the inner surface of the cup so as to allow free passage of water flowing out of the cup.

It was stated above that certain relative movements of the housing inside the cup can be freely accomodated. However, in order to convey the cup at greater housing movements away from the cup, the housing is provided with a circumferential ridge for engaging the internal ring of the cup.

For pushing the cup in the other direction at greater axial housing movements in that direction, the cup is provided with an internal abutment in the vicinity of the sealing ring for engaging the free end of the housing.

BRIEF DESCRIPTION OF THE DRAWING

The invention will be described in further detail below reference being made to the accompanying drawing, in which FIG. 1 is a side view, partly in section, of a portion of a rail vehicle slack adjuster with a prior art sealing and FIG. 2 is a corresponding side view showing a sealing according to the invention.

DETAILED DESCRIPTION OF A PREFERRED EMBODIMENT

In a conventional rail vehicle slack adjuster of the so called axial type a circular rod or spindle 1 (FIG. 1) is intended to move axially back and forth but also to rotate relative to a substantially tubular housing or barrel 2, as is well known to any person skilled in the art.

A prior art sealing for preventing intrusion of undesired matter into the housing but still allowing said relative movements is shown in FIG. 1. In an enlarged end part of the housing 2 an insert 3 of plastic material is arranged having an inner diameter only slightly larger than that of the spindle 1. An ordinary O-ring 4 is sealingly arranged between the insert 3 and the housing 2. One or more—in the shown example two—sealing rings 5 are arranged in suitable internal grooves in the insert 3. In order to withstand the stresses imposed thereon these rings 5 may preferably be manufactured of a plastic material. Each ring 5 may be given the necessary flexibility by being split and provided with an internal spring ring 6.

Due to the frequent relative movements, which occur at each and every brake applications, the useful life of the sealing arrangement is not adequate in some instances.

A sealing arrangement according to the invention is shown in FIG. 2. Again, a circular rod or spindle is intended to move axially back and forth but also to rotate relative to a substantially tubular housing or barrel 7. This housing 7 is towards its end provided with a circumferential ridge 8 (for a purpose to be described) and also with a portion 9 closely surrounding the spindle 1 without interferring with its free movements.

Surrounding the free end of the housing 7 (and thus the ridge 8 and the portion 9) is a cup 10 having a generally frusto-conical shape with a small inclination angle. At its forward end (or end to the left in FIG. 2) the cup is provided with a sealing ring 11, preferably a rubber O-ring, engaging the spindle 1. Towards its other free end, having a somewhat larger diameter, the cup 10 is provided with an internal ring 12 with an inner diameter only slightly larger than the outer diameter of the housing 7. This ring 12 constitutes a guiding for the cup 10 but also serves to prevent the intrusion of certain contaminants in the cup 10. Circumferentially around the ring 12 there are a number of through holes 12′ flush with the inner surface of the cup 10. These holes 12′ serve to drain out water that may have entered the cup or condensated therein; such water flows along the inclined surface of the cup 10.

The sealing function of the arrangement shown and described is a combination of that obtained by the O- ring 11 and the labyrinth sealing by the cup 10 with its ring 12 and by the housing ridge 8 and portion 9.

In use the cup 10 will normally—through the engagement between the O-ring 11 and the spindle 1—follow the spindle in its axial and rotational movements relative to the housing 7, whch means that the O-ring 11 is not worn. Only at major axial movements of the spindle 1 the cup 10 will be transferred thereon by the engagement either between the housing portion 9 with an internal cap abutment 10' or between the housing ridge 8 and the cup ring 12. Such axial movements occur relatively seldom and do not unduly restrict the useful life of the O-ring 11.

The sealing arrangement is described in its use for a rail vehicle slack adjuster but is equally well suited in many other instances with similar problems and with similar relative movements.

I claim:

1. A sealing structure to prevent intrusion of foreign matter including water into a generally tubular housing closely encompassing a rod which is both rotatable and axially movable within the housing, comprising in combination, a cuplike member disposed about the rod to closely conform with the outer dimension of the rod near one end and an inner dimension greater than the dimension of the housing near the other end and extending axially along the rod to overlap with the housing, a sealing ring to preventing said intrusion of foreign matter retained by the cuplike member engaging the rod at its closely conforming end to permit rotational movement, and movable with the cuplike member axially with movement of the rod over at least a portion of an axial movement stroke of the rod within the housing while the other end of the cuplike member overlaps the housing and moves axially relative to the housing, and
   interengaging structure between the inner surface of the cuplike member and the outer surface of said housing including a ridge on the housing for causing the sealing ring to move along the rod over portions of an axial movement range of the rod within the housing.

2. A sealing structure providing a labyrinth sealing path about a circumferential ridge disposed on the housing in the overlap portion to prevent intrusion of foreign matter including water into a generally tubular housing closely encompassing a rod which is both rotatable and axially movable within the housing, comprising in combination, a cuplike member disposed about the rod to closely conform with the outer dimension of the rod near one end and an inner dimension greater than the dimension of the housing near the other end and extending axially along the rod to overlap with the housing, a sealing ring for preventing said intrusion of foreign matter retained by the cuplike member engaging the rod at its closely conforming end to permit rotational movement and movable with the cuplike member axially with movement of the rod over at least a portion of an axial movement stroke of the rod within the housing while the other end of the cuplike member overlaps the housing and moves axially relative to the housing, and a ring 12 extending inwardly from the greater dimension end of the cuplike member formed by respective extension from the inner dimension of the cuplike member of a diameter slightly greater than a corresponding outer dimension of the tubular housing.

* * * * *